United States Patent Office 3,382,225
Patented May 7, 1968

3,382,225
PREVENTION OF COLD FLOW IN POLYBUTADI-
ENE BY ADDING AN ORGANIC COMPOUND
HAVING AT LEAST TWO HALOGEN ATOMS AT-
TACHED ONE CARBON ALPHA TO AN ETHER
OXYGEN IN SAID COMPOUND
Floyd E. Naylor, Bartlesville, Okla., assignor to Phillips
Petroleum Company, a corporation of Delaware
No Drawing. Filed Nov. 2, 1964, Ser. No. 408,413
5 Claims. (Cl. 260—94.3)

ABSTRACT OF THE DISCLOSURE

Polymers of butadiene, having a high percentage of cis-1,4 addition and a reduced tendency to cold flow in the unvulcanized state, are made by contacting 1,3-butadiene with a catalyst formed by mixing at least one organometal compound and a component containing titanium and iodine and at the conclusion of the polymerization, adding an organic compound having at least two halogen atoms that are attached to at least one carbon atom alpha to an ether oxygen in said compound.

---

This invention relates to a method for preventing or substantially reducing the tendency of certain polybutadienes to cold flow. In one aspect it relates to a novel composition containing cis-polybutadiene and a treating agent which reduces the tendency of the polybutadiene to cold flow.

The production of rubbery polymers is widespread. One of the products that is becoming increasingly important is polybutadiene containing a high percentage, e.g., at least 85 percent, of cis-1,4 addition. The physical properties of this polymer makes it particularly suitable for heavy duty automobile and truck tires and other articles for which natural rubber has heretofore been preferred. However, in the processing of certain polybutadienes, difficulties have been encountered from the tendency of the polymer to cold flow in the unvulcanized state. For example, in the event of cracks or punctures in the package, polymer flows therefrom, leading to product loss or contamination, sticking together of packages, and the like.

It is an object of this invention to provide a method for eliminating or substantially reducing the tendency of cis-polybutadiene to cold flow when in the unvulcanized state.

Another object of this invention is to provide a novel composition which contains cis-polybutadiene and a treating agent which prevents or substantially reduces cold flow.

Other aspects, advantages, and objects of this invention will be apparent to those skilled in the art upon consideration of the accompanying disclosure and claims.

The present invention is concerned with the production of improved polybutadiene products which have a reduced tendency to cold flow when in the unvulcanized state. Thus, the invention resides in an improvement in polybutadiene products prepared by polymerizing 1,3-butadiene with a catalyst system formed by mixing materials comprising an organometal and an iodine containing component. The improvement comprises adding to the polymerization mixture an ether in which at least two active halogen atoms are present and are attached to carbon atoms alpha to the ether oxygen. The halogenated ether compounds are added to the polymerization mixture before the catalyst is deactivated.

The treating agents that are added to the polymerization mixture have the following formula:

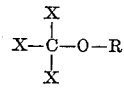

wherein X is selected from the group consisting of hydrogen, halogen, saturated aliphatic hydrocarbon radicals, saturated cycloaliphatic hydrocarbon radicals, aromatic hydrocarbon radicals, halogen substituted saturated aliphatic radicals, halogen substituted saturated cycloaliphatic radicals, and halogen substituted aromatic radicals; R is selected from the group consisting of saturated aliphatic hydrocarbon radicals, saturated cycloaliphatic hydrocarbon radicals, aromatic hydrocarbon radicals, halogen substituted saturated aliphatic radicals, halogen substituted saturated cycloaliphatic radicals, halogen substituted aromatic radicals and radicals having the formula

and at least two halogen atoms are attached to carbon atoms which are attached to the ether oxygen. The ether compound can have up to a total of 20 carbon atoms per molecule and can be partially or completely halogenated. It is within the scope of this invention to employ mixtures of the various halogenated ether compounds. The active halogen containing compounds can contain fluorine, chlorine, bromine, or iodine, or mixtures of these halogen atoms. However, chlorine, bromine, and iodine compounds are preferred, and more particularly compounds containing chlorine. Since the ether compound must have at least two halogen atoms attached to carbon atoms alpha to the ether oxygen, they will hereafter be referred to as alpha halogenated ethers.

Specific examples of alpha halogenated ethers that can be employed in the practice of this invention include the following:

bis(chloromethyl) ether
bis(1-bromoethyl) ether
bis(bromoethyl) ether
methyl dichloromethyl ether
bis(1-fluoropropyl) ether
bis(iodomethyl) ether
chloromethyl 1-chloropropyl ether
bis(1-iodopentyl) ether
bis(1-chlorodecyl) ether
hexyl 1,1-dichloroheptyl ether
1-chloro-n-butyl 1,1-dichloro-n-butyl ether
bis(1,1-dibromodecyl) ether
1,1-difluoroethyl 1-fluoroheptyl ether
bis[1-bromo(2-ethyl)butyl] ether
difluoromethyl 1-fluoropropyl ether
1,1-dibromohexyl 1,1-dichlorodecyl ether
1,1-dichloropropyl cyclohexyl ether
1-chloro-1-bromobutyl phenyl ether
1,1-diiodopentyl 4-chlorobenzyl ether
1,1,3-trichlorohexyl 3-chlorocyclohexyl ether
bis(trichloromethyl) ether
bis(dichlorophenylmethyl) ether
bis[difluoro-(4-tolyl)methyl] ether
1-chloro-1-bromo-3-phenylpropyl hexachlorophenyl ether
1,1-dichlorobutyl 1,1,4-trichloro-3-n-propyl-7-phenyl-
  heptyl ether and the like.

In carrying out the invention the alpha halogenated ether is added either per se or as a solution to the unquenched polymer solution. By "unquenched polymer" is meant polymer which has not been treated with any type of reagent to inactivate the catalyst. Suitable solvents for the alpha halogenated ether include materials which are employed as diluents in the preparation of the cis-polybutadiene. At the conclusion of the polymerization the treating agent is added and the mixture is agitated to facilitate contact of the reactants. The temperature can be adjusted as desired either before or after addition of the alpha halogenated ether.

Reaction of the alpha halogenated ether with the unquenched cis-polybutadiene solution can be carried out over a wide range of conditions. A suitable treating temperature will generally be in the range from about 0° F. to 250° F., preferably from about 20° F. to 175° F. The treating time will depend upon the temperature as well as upon the alpha halogenated ether which is used. It will be in the range of one second to 5 hours or longer. In instances when the polymerization temperature is above about 20° F., satisfactory results can often be obtained with a treating time of 5 minutes or less when the temperature is maintained at the level used for polymerization. In other instances, depending upon the results desired, a longer treating time at a higher temperature is preferred.

The amount of alpha halogenated ether employed for reduction in cold flow of cis-polybutadiene is based on the organometal component in the catalyst. It will generally be in the range of 0.05 to 10 millimoles per mole of organometal compound.

The present invention is generally applicable to polybutadiene containing a high percentage of cis-1,4 addition. It is usually preferred that the polybutadiene contain at least 85 percent cis-1,4 addition, e.g., 85 to 98 percent and higher. The cis-polybutadiene can be prepared by polymerizing butadiene with a catalyst system which is formed by mixing materials comprising an organometal compound and iodine, present either in the free or combined state. This type of polymerization system produces a cis-polybutadiene having outstanding physical properties when in the cured state but having a tendency to cold flow in the unvulcanized state.

The cis-polybutadiene can be prepared by polymerizing 1,3-butadiene with any one of a large number of different stereospecific catalyst systems. Among the catalysts employed are those selected from the group consisting of (1) a catalyst formed by mixing materials comprising an organometal compound having the formula $R_mM$, wherein R is an alkyl, cycloalkyl, aryl, alkaryl, aralkyl, alkylcycloalkyl, cycloalkylalkyl, arylcycloalkyl or cycloalkylaryl radical, M is aluminum, mercury, zinc, beryllium, cadmium, magnesium, sodium or potassium, and $m$ is equal to the valence of the metal M, and titanium tetraiodide, (2) a catalyst formed by mixing materials comprising an organometal compound having the formula $R_nM'$, wherein R is an organo radical as defined above, M' is aluminum, magnesium, lead, sodium or potassium, and $n$ is equal to the valence of the metal M', titanium tetrachloride and titanium tetraiodide, (3) a catalyst formed by mixing materials comprising an organometal compound having the formula $R_aM''$, wherein R is an organo radical as defined above, M'' is aluminum or magnesium and $a$ is equal to the valence of the metal M'', a compound having the formula $TiX_b$, wherein X is chlorine or bromine and $b$ is an integer from 2 to 4, inclusive, and elemental iodine or an organic iodide, (4) a catalyst formed by mixing materials comprising an organometal compound having the formula $R_xM'''$ wherein R is an organo radical as defined above, M''' is aluminum, gallium, indium or thallium, and $x$ is equal to the valence of the metal M''', a titanium halide having the formula $TiX_4$ wherein X is chlorine or bromine, and an inorganic halide having the formula $M^{iv}I_c$, wherein $M^{iv}$ is beryllium, zinc, cadmium, aluminum, gallium, indium, thallium, silicon, germanium, tin, lead, phosphorus, antimony, arsenic, and bismuth, and $c$ is an integer from 2 to 5, inclusive, and (5) a catalyst formed by mixing materials comprising an organo compound having the formula $R_xM'''$, wherein R, M''' and $x$ are as defined above, titanium tetraiodide, and an inorganic halide having the formula $M^vX_d$, wherein $M^v$ is aluminum, gallium, indium, thallium, germanium, tin, lead, phosphorus, antimony, arsenic or bismuth, X is chlorine or bromine, and $d$ is an integer from 2 to 5, inclusive. The R radicals of the aforementioned formulas preferably contain up to and including 20 carbon atoms.

The following are examples of preferred catalyst systems which can be used to polymerize 1,3-butadiene to a cis-1,4-polybutadiene:

triisobutylaluminum and titanium tetraiodide
triethylaluminum and titanium tetraiodide
triisobutylaluminum, titanium tetrachloride and titanium tetraiodide
diethylzinc and titanium tetraiodide
dibutylmercury and titanium tetraiodide
triisobutylaluminum, titanium tetrachloride and iodine
triethylaluminum, titanium tetrabromide and iodine
n-amylsodium and titanium tetraiodide
phenylsodium and titanium tetraiodide
n-butylpotassium and titanium tetraiodide
phenylpotassium and titanium tetraiodide
n-amylsodium, titanium tetrachloride and titanium tetraiodide
triphenylaluminum and titanium tetraiodide
triphenylaluminum, titanium tetraiodide and titanium tetrachloride
triphenylaluminum, titanium tetrachloride and iodine
tri-alpha-naphthylaluminum, titanium tetrachloride and iodine
tribenzylaluminum, titanium tetrabromide and iodine
diphenylzinc and titanium tetraiodide
di-2-tolylmercury and titanium tetraiodide
tricyclohexylaluminum, titanium tetrachloride and titanium tetraiodide
ethylcyclopentylzinc and titanium tetraiodide
tri(3-isobutylcyclohexyl)aluminum and titanium tetraiodide
tetraethyllead, titanium tetrachloride and titanium tetraiodide
diphenylmagnesium and titanium tetraiodide
di-n-propylmagnesium titanium tetrachloride and titanium tetraiodide
dimethylmagnesium, titanium tetrachloride and iodine
diphenylmagnesium, titanium tetrabromide and iodine
methylethylmagnesium, and titanium tetraiodide
dibutylberyllium and titanium tetraiodide
diethylcadmium and titanium tetraiodide
diisopropylcadmium and titanium tetraiodide
triisobutylaluminum, titanium tetrachloride, and 1,4-diiodo-2-butene
triethylaluminum, titanium tetrabromide, and isobutyl iodide
di-n-propylmagnesium, titanium tetrachloride and methyl iodide
triisobutylaluminum, titanium tetrachloride, and iodoform
triisobutylaluminum, titanium tetrachloride, and antimony triiodide
triisobutylaluminum, titanium tetrachloride and aluminum triiodide
triisobutylaluminum, titanium tetrabromide, and aluminum triiodide
triethylaluminum, titanium tetrachloride and phosphorus triiodide
tri-n-dodecylaluminum, titanium tetrachloride, and tin tetraiodide
triethylgallium, titanium tetrabromide, and aluminum triiodide
tri-n-butylaluminum, titanium tetrachloride, and antimony triiodide
tricyclopentylaluminum, titanium tetrachloride, and silicon tetraiodide
triphenylaluminum, titanium tetrachloride, and gallium triiodide triisobutylaluminum, titanium tetraiodide and tin tetrachloride triisobutylaluminum, titanium tetraiodide and antimony trichloride triisobutylaluminum, titanium tetraiodide and aluminum trichloride triisobutylaluminum, titanium tetraiodide, and tin tetrabromide triethylgallium, titanium tetraiodide, and aluminum tribromide triethylaluminum, titanium tetraiodide, and arsenic trichloride, and tribenzylaluminum, titanium tetraiodide, and germanium tetrachloride.

The polymerization process for preparing cis-polybutadiene is generally carried out in the presence of a hydrocarbon diluent which is not deleterious to the catalyst system. Examples of suitable diluents include aromatic, paraffinic and cycloparaffinic hydrocarbons, it being understood that mixtures of these materials can also be used. Specific examples of hydrocarbon diluents include benzene, toluene, n-butane, isobutane, n-pentane, isooctane, n-dodecane, cyclopentane, cyclohexane, methylcyclohexane, and the like. It is often preferred to employ aromatic hydrocarbons as the diluent.

The amount of the catalyst employed in polymerizing 1,3-butadiene to a cis-polybutadiene can vary over a rather wide range. The amount of the organometal used in forming the catalyst compostion is usually in the range of 0.75 to 20 moles per mole of the halogen-containing catalyst component, i.e., a metal halide with or without a second metal halide or elemental iodine. The mole ratio actually used in a polymerization will depend upon the particular components employed in the catalyst system. However, a preferred mole ratio is generally from 1:1 to 12:1 of the organometal compound to the halogen-containing catalyst component. When using a catalyst comprising an organometal compound and more than one metal halide, e.g., titanium tetrachloride and titanium tetraiodide, titanium tetrachloride or tetrabromide and aluminum iodide, the mole ratio of the tetrachloride or tetrabromide to the iodide is usually in the range of 0.05:1 to 5:1. With a catalyst system comprising an organometal compound, a titanium chloride or bromide and elemental iodine, the mole ratio of the halide to iodine is generally in the range of 10:1 to 0.25:1, preferably 3:1 to 0.25:1. The concentration of the total catalyst composition, i.e., organometal and halogen-containing catalyst component, is usually in the range of 0.01 to 10 weight percent, preferably in the range of 0.01 to 5 weight percent, based on the total amount of 1,3-butadiene charged to the reactor system.

The process for preparing cis-polybutadiene can be carried out at temperatures varying over a rather wide range, e.g., from −100 to 250° F. It is usually preferred to operate at a temperature in the range of −30 to 160° F. The polymerization reaction can be carried out under autogenous pressure or at any suitable pressure sufficient to maintain the reaction mixture substantially in the liquid phase. The pressure will thus depend upon the particular diluent employed and the temperature at which the polymerization is conducted. However, higher pressures can be employed if desired, these pressures being obtained by some such suitable method as the pressurization of the reactor with a gas which is inert with respect to the polymerization reaction.

Various materials are known to be detrimental to the catalyst employed in preparing the cis-polybutadiene. These materials include carbon dioxide, oxygen and water. It is usually desirable, therefore, that the butadiene and the diluent be freed of these materials as well as other materials which may tend to inactivate the catalyst. Furthermore, it is desirable to remove air and moisture from the reaction vessel in which the polymerization is to be conducted.

Upon completion of the polymerization reaction, the reaction mixture is treated with the alpha halogenated ether compound. The reaction mixture containing the alpha halogenated ether compound is then treated to inactivate the catalyst and recover the rubbery polymer having a reduced tendency to cold flow. One suitable method of inactivating the catalyst material is by the addition of an alcohol, which inactivates the catalyst and causes the rubbery polymer to coagulate. The polymer is then separated from the alcohol and diluent by any suitable means, such as decantation or filtration. It has been found to be advantageous to add an antioxidant such as phenyl-beta-naphthylamine, 2,2′-methylene - bis(4-methyl-6-tertiary-butylphenol), etc., to the polymer solution prior to the recovery of the polymer. A more comprehensive understanding of the invention may be obtained by referring to the following illustrated examples which are not intended, however, to be unduly limitative of the invention.

Example I

The following recipe was employed for the production of cis-polybutadiene:

| | |
|---|---:|
| Toluene, parts by weight | 1000 |
| 1,3-butadiene, parts by weight | 100 |
| Triisobutylaluminum, mhm.[1] | 2.3 |
| Iodine, mhm.[1] | 0.8 |
| Titanium tetrachloride, mhm.[1] | 0.4 |
| Temperature, ° F. | 41 |
| Time, hour | 0.5 |

[1] Millimoles per 100 grams of butadiene.

Toluene was charged first, the reactor was purged with nitrogen, butadiene was added, and then the triisobutylaluminum, iodine, and titanium tetrachloride. Two runs were made. In each run a sample was withdrawn after a polymerization period of 0.5 hour and cold flow and conversion were determined. To the remainder of run 1 bis(chloromethyl) ether (8 millimoles per 100 grams of butadiene charged) was added and the mixture was agitated for 30 minutes while the temperature was maintained at 30° C. (86° F.). One part by weight per 100 parts by weight polymer of 2,2′-methylene-bis(4-methyl-6-tert-butylphenol) dissolved in a mixture of equal volumes of isopropyl alcohol and toluene was added after which the polymer was coagulated in isopropyl alcohol, separated, and dried. Cold flow and conversion were again determined. The final conversion was calculated from the weight of the product recovered. After the first portion of run 2 was withdrawn, the remainder was heated, with agitation, at 30° C. for 30 minutes. The polymer was recovered as in run 1 and cold flow and final conversion were determined. The following results were obtained:

| | 1 | 2 |
|---|---|---|
| Conversion, percent, 0.5 hour | 51 | 50 |
| Cold flow, mg./min.[1] | | |
| Original | 2.8 | 2.3 |
| After bis(chloromethyl) ether treatment | 0.04 | |
| After heating 30 min. at 30° C. | | 0.83 |
| Final conversion | 85 | 97 |

[1] Cold flow was measured by extruding the rubber through a ¼-inch orifice at 3.5 p.s.i. pressure and a temperature of 50° C. (122° F.). After allowing 10 minutes to reach steady state, the rate of extrusion was measured and reported in milligrams per minute.

These results show that even though a reduction in cold flow was achieved by heat treatment alone, the effect was not nearly so pronounced as in the run in which the unquenched polymer solution was treated with bis(chloromethyl) ether.

Example II

Three runs were made for the polymerization of butadiene using the recipe of Example I. Polymerization was carried out for two hours at 41° F. Run 1 was shortstopped with one part by weight per 100 parts by weight polymer of 2,2′ - methylene - bis(4 - methyl-6-tert-butylphenol) dissolved in a mixture of equal volumes of isopropyl alcohol and toluene after which the polymer was coagulated in isopropyl alcohol, separated, and dried. Cold flow and conversion were determined. Runs 2 and 3 were treated with 2.4 and 4.8 millimoles, respectively, per 100 grams monomer charged, of bis(chloromethyl) ether, the mixtures were agitated for about 30 seconds to insure blending, and immediately thereafter a solution of 2,2'-methylene-bis(4-methyl-6-tert-butylphenol) was added as in run 1. The polymers were coagulated in isopropyl alcohol, separated, and dried, after which cold flow and conversion were determined. Results were as follows:

| | 1 | 2 | 3 |
|---|---|---|---|
| Conversion, percent | 91 | 92 | 93 |
| Cold flow, mg./min.: [1] No treatment | 2.96 | | |
| Bis(chloromethyl) ether, 2.4 mhm.[2] | | 0.59 | |
| Bis(chloromethyl) ether, 4.8 mhm.[2] | | | 0 |

[1] Described in Example I.
[2] Described in Example I.

These results show that bis(chloromethyl) ether was a very effective agent for reducing cold flow of cis-polybutadiene.

Many variations and modifications of the foregoing disclosure will be evident to those skilled in the art. It is to be understood that all matter herein set forth is to be interpreted as illustrative and not as unduly limiting the scope and spirit of the invention.

I claim:
1. In a process wherein a polymerization reaction mixture is formed by polymerizing 1,3-butadiene in the presence of an initiator obtained by mixing at least an organometal compound as a first component and a second component containing titanium and iodine the improvement which comprises adding to said reaction mixture, at the conclusion of the polymerization, a compound having the formula:

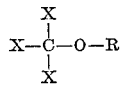

wherein X is selected from the group consisting of hydrogen, halogen, saturated aliphatic hydrocarbon radicals, saturated cycloaliphatic hydrocarbon radicals, aromatic hydrocarbon radicals, halogen substituted saturated aliphatic radicals, halogen substituted saturated cycloaliphatic radicals, and halogen substituted aromatic radicals; R is selected from the group consisting of saturated aliphatic hydrocarbon radicals, saturated cycloaliphatic hydrocarbon radicals, aromatic hydrocarbon radicals, halogen substituted saturated aliphatic radicals, halogen substituted saturated cycloaliphatic radicals, halogen substituted aromatic radicals and radicals having the formula

and at least two halogen atoms are attached to carbon atoms which are attached to the ether oxygen, said compound having up to a total of 20 carbon atoms and recovering a polybutadiene product having a high percentage of cis-1,4-addition and a reduced tendency to cold flow in the unvulcanized state.

2. In a process wherein a polymerization reaction mixture is formed by polymerizing 1,3-butadiene in the presence of a hydrocarbon diluent and an initiator formed by mixing at least an organometal compound as a first component and a second component containing titanium and iodine, said polymerization occurring at a temperature in the range of −100 to 250° F. and at a pressure sufficient to maintain said reaction mixture substantially in the liquid phase, the improvement which comprises adding to said reaction mixture, at the conclusion of the polymerization, a compound having a formula:

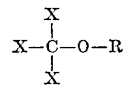

wherein X is selected from the group consisting of hydrogen, halogen, saturated aliphatic hydrocarbon radicals, saturated cycloaliphatic hydrocarbon radicals, aromatic hydrocarbon radicals, halogen substituted saturated aliphatic radicals, halogen substituted saturated cycloaliphatic radicals, and halogen substituted aromatic radicals; R is selected from the group consisting of saturated aliphatic hydrocarbon radicals, saturated cycloaliphatic hydrocarbon radicals, aromatic hydrocarbon radicals, halogen substituted saturated aliphatic radicals, halogen substituted saturated cycloaliphatic radicals, halogen substituted aromatic radicals and radicals having the formula

and at least two halogen atoms are attached to carbon atoms which are attached to the ether oxygen, said compound having up to 20 carbon atoms, said compound being added to said polymerization mixture at a temperature in the range of 0 to 250° F., contacting said compound and said polymerization mixture for a period of 1 second to 5 hours and recovering a polybutadiene product having a high percentage of cis-1,4-addition and a reduced tendency to cold flow in the unvulcanized state.

3. In a process wherein a polymerization reaction mixture is formed by polymerizing 1,3-butadiene in the presence of an initiator obtained by mixing triisobutylaluminum, iodine and titanium tetrachloride the improvement which comprises adding to said reaction mixture at the conclusion of the polymerization, a compound having the formula:

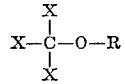

wherein X is selected from the group consisting of hydrogen, halogen, saturated aliphatic hydrocarbon radicals, saturated cycloaliphatic hydrocarbon radicals, aromatic hydrocarbon radicals, halogen substituted saturated aliphatic radicals, halogen substituted saturated cycloaliphatic radicals, and halogen substituted aromatic radicals; R is selected from the group consisting of saturated aliphatic hydrocarbon radicals, saturated cycloaliphatic hydrocarbon radicals, aromatic hydrocarbon radicals, halogen substituted saturated aliphatic radicals, halogen substituted saturated cycloaliphatic radicals, halogen substituted aromatic radicals and radicals having the formula

and at least two halogen atoms are attached to carbon atoms which are attached to the ether oxygen, said compound having up to a total of 20 carbon atoms and recovering a polybutadiene product having a reduced tendency to cold flow in the unvulcanized state.

4. In a process wherein a polymerization reaction mixture is formed by polymerizing 1,3-butadiene in the presence of an initiator obtained by mixing triisobutylaluminum, iodine and titanium tetrachloride, said polymerization occurring at a temperature in the range of −100 to 250° F. and a pressure sufficient to maintain said reaction mixture substantially in the liquid phase, the improvement which comprises adding to said reaction mixture, at the conclusion of the polymerization, a compound having a formula:

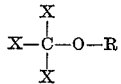

wherein X is selected from the group consisting of hydrogen, halogen, saturated aliphatic hydrocarbon radicals, saturated cycloaliphatic hydrocarbon radicals, aromatic hydrocarbon radicals, halogen substituted saturated aliphatic radicals, halogen substituted saturated cycloaliphatic radicals, and halogen substituted aromatic radicals; R is selected from the group consisting of saturated aliphatic hydrocarbon radicals, saturated cycloaliphatic hydrocarbon radicals, aromatic hydrocarbon radicals, halogen substituted saturated aliphatic radicals, halogen substituted saturated cycloaliphatic radicals, halogen substituted aromatic radicals and radicals having the formula

and at least two halogen atoms are attached to carbon atoms which are attached to the ether oxygen, said compound having up to 20 carbon atoms, said compound being added to said polymerization mixture at a temperature in the range of 0 to 250° F., contacting said compound and said polymerization mixture for a period of 1 second to 5 hours and recovering a polybutadiene product having a reduced tendency to cold flow in the unvulcanized state.

5. The process of claim 4 in which bis(chloromethyl) ether is added to the reaction mixture.

References Cited

UNITED STATES PATENTS 3,078,254   2/1963   Zelinski et al. _____ 260—45.5
3,213,075   10/1965  Sonnenfeld _____ 260—94.4

JOSEPH L. SCHOFER, *Primary Examiner.*
R. A. GAITHER, *Assistant Examiner.*